Figure 1:
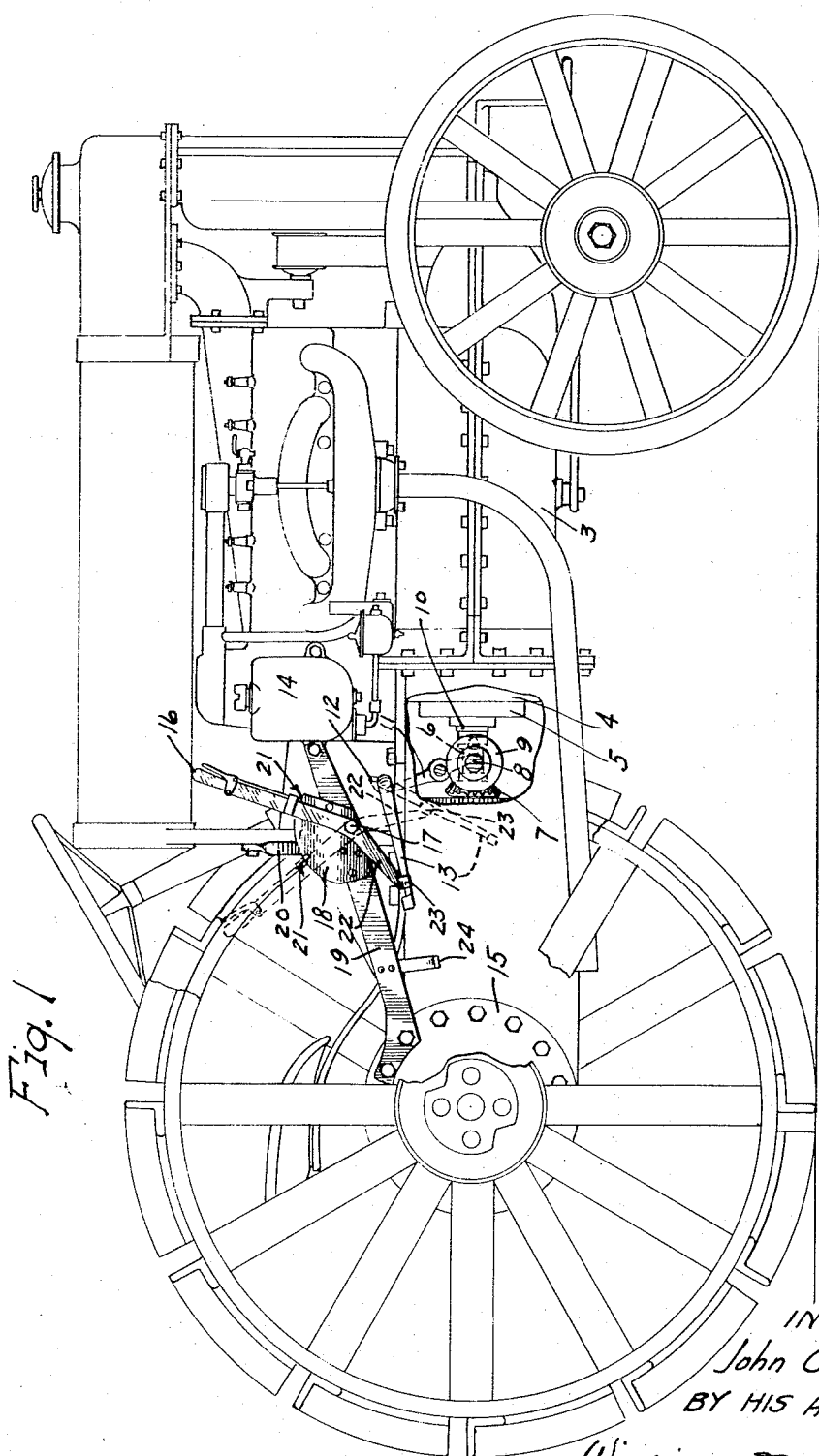

J. C. FLIGGE.
CLUTCH PEDAL LOCK.
APPLICATION FILED MAR. 8, 1920.

1,364,988.

Patented Jan. 11, 1921.
2 SHEETS—SHEET 2.

INVENTOR
John C. Fligge
BY HIS ATTORNEYS
Williamson Merchant

UNITED STATES PATENT OFFICE.

JOHN C. FLIGGE, OF WOODLAKE, MINNESOTA.

CLUTCH-PEDAL LOCK.

1,364,988.　　　　Specification of Letters Patent.　　Patented Jan. 11, 1921.

Application filed March 8, 1920. Serial No. 364,137.

*To all whom it may concern:*

Be it known that I, John C. Fligge, a citizen of the United States, residing at Woodlake, in the county of Yellow Medicine and State of Minnesota, have invented certain new and useful Improvements in Clutch-Pedal Locks; and I do hereby declare the following to be a full, clear, and exact description of the invention, such as will enable others skilled in the art to which it appertains to make and use the same.

My invention has for its object to provide an extremely simple and highly efficient clutch pedal lock intended for general use, but is especially adapted for use as an attachment for Fordson tractors, and to this end, it consists of the novel devices and combinations of devices hereinafter described and defined in the claim.

In the accompanying drawings, which illustrate the invention, like characters indicate like parts throughout the several views.

Referring to the drawings:—

Figure 2:
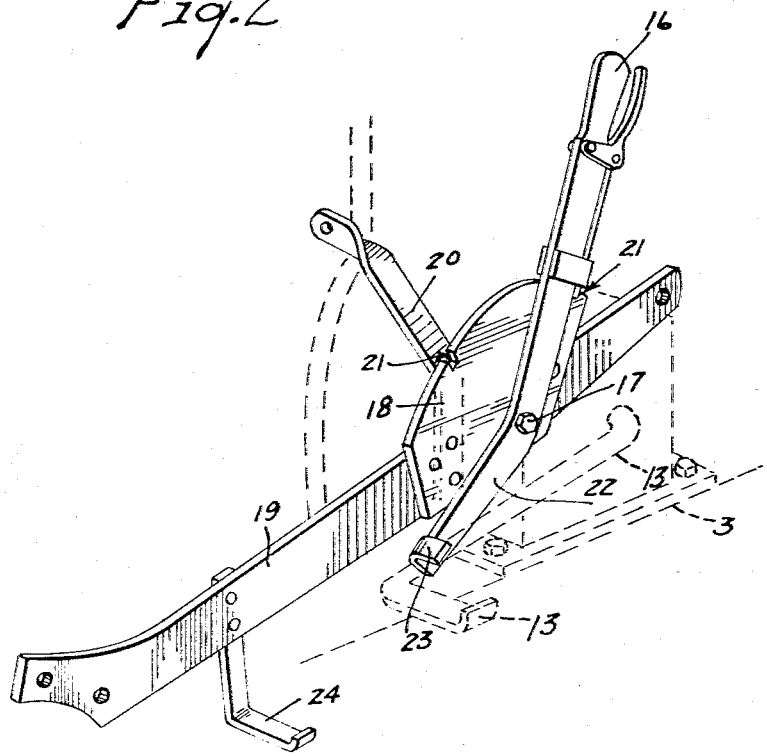

Figure 1 is a side elevation of a Fordson tractor having the invention applied thereto; and Fig. 2 is a perspective view of the invention, on an enlarged scale, with some parts of the tractor indicated by means of broken lines.

The numeral 3 indicates, as an entirety, a standard Fordson tractor, with the exception of various different elements including the fly wheel 4 and a yieldingly and normally set clutch 5, which connects the engine crank shaft to the transmission drive shaft 6 and has keyed thereto a bevel gear 7 that meshes with a bevel gear 8 on a pulley shaft 9, which extends transversely through the transmission housing. The clutch 5 is provided with a clutch-released plate 10, to which the lower end of an intermediately fulcrumed clutch lever 11 is attached. The upper end of the clutch lever 11 works through a slot in the top of the transmission housing and is subject to a clutch-releasing cam 12 on the hub of a clutch pedal 13 journaled on top of said transmission housing. It is also important to note the gasolene tank 14 secured in position by bolts, and the transmission housing plate 15, which is also secured in position by bolts.

The clutch pedal 13 is normally held raised by the action of the clutch 5 under its yielding setting action, and to release said clutch, the operator must press downward on said clutch pedal and hold the same down as long as he desires to keep the clutch released. To crank the engine, when a belt is on the pulley of the shaft 8, it is now the custom to have someone, in addition to the person cranking the engine, hold the clutch pedal down or fasten the same down by a stick or other means.

The improved attachment includes a latch lever 16 fulcrumed at 17 to a lock segment 18 rigidly secured to a bracket 19. This bracket 19 is, as shown, in the form of a horizontally and longitudinally extended bar, the front end of which is held by one of the bolts of the gas tank 14 and the rear end of said bar is held by certain of the bolts of the transmission housing plate 15. The bracket 19 is further rigidly secured in position by a transverse brace 20.

Formed in the periphery of the lock segment 18 are front and rear lock notches 21 with which the latch lever 16 coöperates to lock the same in its two extreme positions. Formed on the lower end of the latch lever 16 is an arm 22 having at its free end a laterally and outwardly projecting finger 23 which projects over the clutch pedal 13 near the free end thereof. When the latch lever 16 is secured in the foremost lock notch 21, the finger 23 is held in such a position as to permit free movement of the clutch pedal 13, as indicated by full and broken lines in Fig. 1. In case the latch lever 16 is moved from its foremost position, as indicated by full lines in Fig. 1, the finger 23 is brought into engagement with the clutch pedal 13 and carries the same downward to release the clutch, and when said latch lever interlocks with the rearmost notch 21, the clutch pedal 13 is held in a released position by the finger 23.

From the above description, it is evident that an operator, by simply drawing the latch lever 16 rearward, may move the clutch pedal 13 into a released position and thus hold the same until the latch lever 16 is again moved into its foremost position. Attached to the bracket 18 is a foot rest 24. Obviously, the improved attachment may be very quickly applied to a Fordson tractor without cutting or mutilating any of the parts thereof.

What I claim is:—

In a tractor, the combination with the clutch pedal thereof, of a latch lever and cooperating lock segment for securing the latch lever in two extreme positions, said latch lever being provided with an arm having a laterally projecting finger extending over the clutch pedal and arranged to permit free movement of the clutch pedal when the latch lever is in one extreme position and to engage the clutch pedal, when the lever is moved to its other extreme position, and carry the clutch pedal into a clutch-releasing position and hold the same in said position.

In testimony whereof I affix my signature in presence of two witnesses.

JOHN C. FLIGGE.

Witnesses:
I. P. HAUCK,
H. W. SCHMIDT.